July 31, 1923.
H. K. HITCHCOCK
DRAWING GLASS SHEETS
Filed Dec. 23, 1919
1,463,582
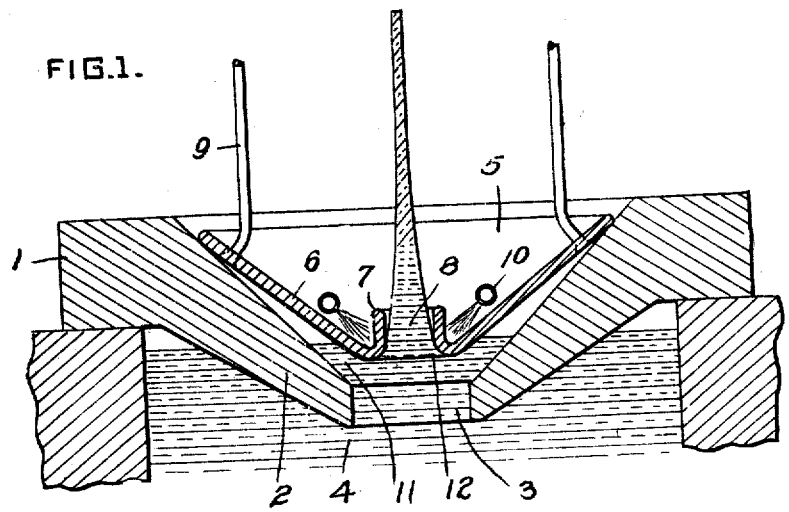
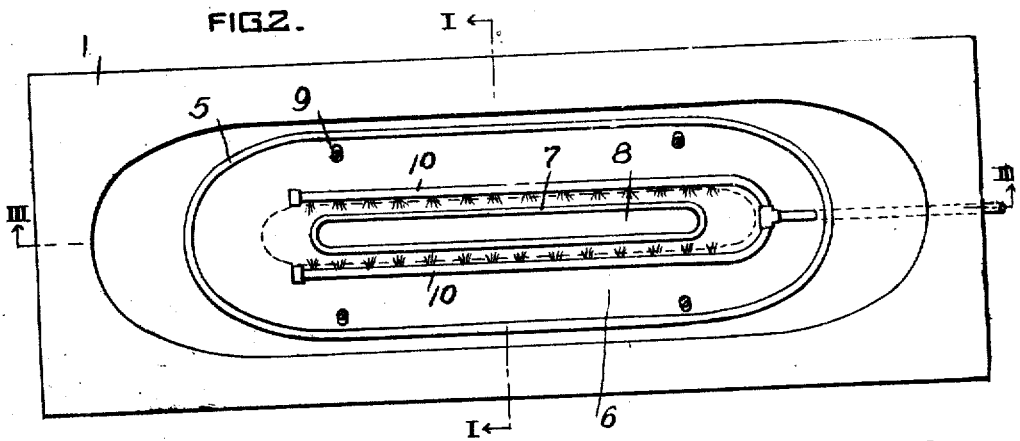
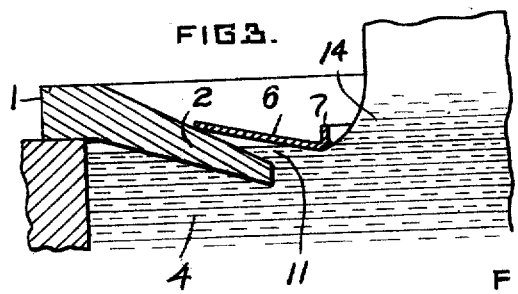
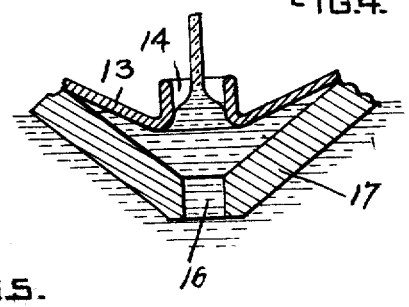
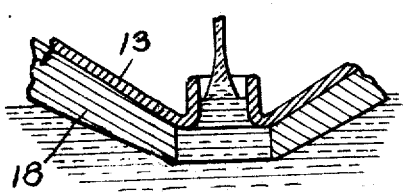
INVENTOR
H. K. Hitchcock
by
James C. Bradley
atty Patented July 31, 1923.

1,463,582

UNITED STATES PATENT OFFICE.

HALBERT K. HITCHCOCK, OF PITTSBURGH, PENNSYLVANIA, ASSIGNOR OF ONE-HALF TO HITCHCOCK EXPERIMENT COMPANY, A CORPORATION OF NEW JERSEY.

DRAWING GLASS SHEETS.

Application filed December 23, 1919. Serial No. 346,845.

*To all who.. it may concern:*

Be it known that I, HALBERT K. HITCHCOCK, a citizen of the United States, and a resident of Pittsburgh, in the county of Allegheny and State of Pennsylvania, have made a new and useful invention in Improvements in Drawing Glass Sheets, of which the following is a specification.

The invention relates to a process and apparatus for drawing glass sheets, and particularly to the class of operations in which the glass is drawn from a refractory slot member. It has for its principal objects; the provision of a slot construction and method of procedure whereby the lining of the surface of the glass is reduced or entirely eliminated; the provision of a construction whereby a flatter, more uniform surface is produced upon the sheet; and the provision of a slot construction and method of procedure wherein the tendency of the edges of the sheet to pull in and narrow the sheet is avoided. Certain embodiments of the invention are illustrated in the accompanying drawings, wherein:

Figure 1 is a vertical section on the line I—I of Fig. 2. Fig. 2 is a plan view of the apparatus, Fig. 3 is a partial vertical section on the line III—III of Fig. 2. Fig. 4 is a vertical transverse section through a modified form of construction, and Fig. 5 is a vertical transverse section through another modification.

Briefly stated, the apparatus employed for carrying out the process comprises a refractory slot member having its slotted portion immersed beneath the surface of a glass bath and a die member of metal, also located in the bath, above the slot in the refractory member, which die member is cooled so that the glass which is drawn therethrough will not adhere to the metal. In carrying out the operation in its preferred form, the glass sheet which is to be drawn is anchored at its base in the slot of the refractory member and pulled up through the die member, which serves to smooth or "marver" the sides of the sheet. The glass as it emerges from the die is also preferably stretched to the desired thickness, which stretching tends to remove any surface lines from the face of the sheet and imparts a brilliant surface to the glass. The base of the sheet which is being drawn may be anchored directly to the refractory member or it may be anchored to such member indirectly, in which latter case the arrangement of the clay member and the metal die member is such that a space is provided between the two members and carries a body of chilled glass. The base of the sheet is adherent to this body of chilled glass and the body of chilled glass is in turn adherent to the clay member. The provision of the chilled glass between the two members is particularly desirable at the ends where the formation of the edges of the sheet occurs, as at this point the normal tendency of the sheet during the drawing operation is to pull in and narrow, and the anchoring of the edges of the sheet to the chilled glass tends to counteract this tendency so that a sheet may be pulled indefinitely without any narrowing effect and without the provision of any outside means to hold the edges in position.

Referring now to the drawings, 1 is the refractory member, preferably of clay, which is provided with inclined sides 2 and a central slot 3, which is normally positioned several inches below the surface of the glass bath 4. Mounted removably upon the inside of the clay member is a die member 5 having the inclined sides 6 and the upturned edge portions 7, between which edges is the drawing slot 8. This die member is preferably made of a metal which will not be affected by the glass, such as copper, nichrome or stellate, the best results so far attained having been secured by the use of nichrome, which is very resistant to the heat or to any action of the glass.

The die member is preferably supported and moved by means of rods 9, having their ends riveted in the sides 6, and means for cooling the member are provided in the form of air pipes 10, having perforations along their lower sides, so that when compressed air is supplied to the pipes a cooling flow is directed upon the upturned edges 7. The cooling of this die member is necessary in order to prevent the metal from heating to such a temperature that the glass will stick thereto, and in order to speed up the cooling of the glass drawn through the slot, so that such glass may be drawn at a high rate of speed. The application of this air also serves to facilitate the chilling of the body of glass at 11 intermediate the clay member and the die member, so that such glass becomes relatively viscous and forms a bond between the clay member and the sheet which is being drawn. The anchoring of the sheet in this manner permits of the operation of stretching the glass heretofore referred to and is desirable because of the improved surface which is given to the sheet due to such stretching. The rounded surfaces 12, over which the sides of the glass sheet are drawn, are highly polished and the drawing of the glass surfaces over these polished surfaces tends to marver and smooth the glass, thus eliminating the lines which might otherwise form when the sheet is drawn directly from a clay slot. The surface produced by the die is truer and flatter than is the case with a sheet drawn from a clay slot, and the cooling action of the die sets the skin or envelope of the sheet so that variation in pressure of the plastic glass inside the envelope will not deform such envelope or destroy the trueness of the surfaces of the sheet.

In some cases the sides 13 of the die member are formed so as to coincide in angle with the sides 18 of the clay member as indicated in Fig. 5, but even in such case the sides of the die member may be made to diverge from the clay member at the edges 14 of the sheet, as indicated in Fig. 3, as the tendency of the sheet to narrow or pull in at its edges is very much reduced when they are securely anchored to the viscous body of glass 11, intermediate the sides of the clay and die members. Furthermore, it may be desirable in some cases to permit a slight adherence of the glass to the die member at the edges of the sheet, as this still further decreases the tendency of the edge to pull in and serves to keep the edge of the sheet hotter than otherwise would be the case. The die member may be allowed to heat to a greater extent at its ends than at its intermediate portions by reducing the supply of cooling air which is applied at such end portions.

Fig. 4 illustrates a modified construction wherein the slot 14 between the upturned edges 15 of the die member is made wider than the slot 16 in the clay member 17. In the operation of this construction the die member is shielded to a greater extent from the heat of the glass beneath the clay member, and as a result less air cooling of the die member is necessary than in the construction of Fig. 1. It will be understood that the proportions of the slot 14 and 16 may be varied widely, depending upon requirements, and that the proportions of the parts throughout are susceptible of wide variation. If desired, a slot which is very much wider even than that which is shown in Figure 1 may be employed, although the preferred proportions are about as indicated in this figure.

In operating the device, the refractory member 1 is positioned in the glass bath, after which the die member is put in place and the parts allowed to heat for a considerable length of time before the drawing operation is started. During this period of heating, air is preferably supplied through the pipes 10 to prevent any overheating of the die member. The die member may also be heated before positioning it in the clay member. After the parts have been thoroughly heated and the glass in the slot 3 arrives at a proper temperature, the bait is dipped into the glass, and after the glass in the slot becomes adherent to such bait, it is drawn slowly upward, forming the glass sheet as illustrated. The base of the sheet is firmly anchored to the body of glass 11 lying beneath the die member and such body 11 is in turn adherent to the submerged portion of the clay member 1. The sides of the sheet are pulled across the highly polished surfaces 12 of the die member and smoothed and polished by reason of such contact. The sheet is relatively thick at its base, as indicated, but remains plastic for a considerable distance above the glass, and the rate of draw is such that this body of glass is stretched and thinned to the proper thickness before the glass cools sufficiently to harden and set. The thickness of the sheet is determined by the size of the die, the speed of draw, and by the amount of cooling secured from the air pipes 10. The process serves to give the glass a fine surface substantially free from the vertical lines ordinarily present where glass is pulled from a clay slot, and the edges of the sheet are automatically maintained against pulling in and so narrowing the sheet, the anchoring means serving to counteract any tendency of the edges to pull away from the ends of the slot.

What I claim is:

1. In a glass drawing apparatus employing a glass bath from which a sheet of glass is to be drawn, a refractory member provided with a drawing slot lying in the bath, a metal die member having a slot portion lying in the bath above the slot in the refractory member, and adapted to contact with the sides of the glass sheet being drawn throughout its width, and means for cooling the die member.

2. In glass drawing apparatus employing a glass bath from which a sheet of glass is to be drawn, a refractory member provided with a drawing slot lying in the bath, a metal die member having a slot portion lying in the bath above the slot in the refractory member, and having the surface thereof over which the glass is drawn polished, and means for cooling the die member.

3. In glass drawing apparatus employing a glass bath from which a sheet of glass is to be drawn, a refractory member provided with a drawing slot lying in the bath, a metal die member having a slot portion lying in the bath above the slot in the refractory member, but spaced away from the refractory member to provide a space for a body of chilled glass intermediate the refractory member and the die member, and means for cooling the die member to chill the said body of glass lying beneath such die member and prevent adherence of the glass to the surface of the die member over which the sides of the glass sheet is drawn.

4. In glass drawing apparatus employing a glass bath from which a sheet of glass is to be drawn, a refractory member provided with a drawing slot lying in the bath, a metal die member having a slot portion lying in the bath above the slot in the refractory member, but spaced away from the refractory member at its ends to provide spaces at such ends for bodies of chilled glass, and means for cooling the die member.

5. In glass drawing apparatus employing a glass bath from which a sheet of glass is to be drawn, a refractory member provided with a drawing slot lying in the bath, a metal die member having a slot portion lying in the bath above the slot in the refractory member, and means for cooling the die member, the slot in the metal die member being of less width than that of the refractory member and such member having its surface around the slot over which the glass is drawn, rounded and polished.

6. In glass drawing apparatus employing a glass bath from which a sheet of glass is to be drawn, a refractory slot member having the slot portion submerged in the bath, a metal die member having a slot portion lying partially submerged in the bath above the slot in the refractory member and contacting with the glass sheet being drawn from edge to edge, and means for cooling the die member.

7. In glass drawing apparatus employing a glass bath from which a sheet of glass is to be drawn, a refractory slot member having the slot portion submerged in the bath, a metal die member having a slot portion lying partially submerged in the bath above the slot in the refractory member, and means for cooling the die member, the slot in the die member being of less width and length than the slot in the refractory member and contacting with the glass sheet being drawn from edge to edge.

8. The process of drawing a glass sheet from a bath of molten glass which consists in anchoring the base of the sheet to a body of clay in the bath, pulling the sheet through a metal die located in the bath above the body of clay and cooling the die.

9. The process of drawing a glass sheet from a bath of molten glass which consists in anchoring the base of the sheet in the bath, pulling the sheet through a metal die, which contacts with the glass sheet being drawn throughout its width and governs its cross section, cooling the die, and stretching the glass sheet above the die.

10. The process of drawing a glass sheet from a bath of molten glass which consists in anchoring the base of the sheet to a body of clay in the bath, pulling the sheet through a metal die located in the bath above the body of clay, cooling the die, and stretching the glass sheet above the die.

11. The process of drawing a glass sheet from a bath of molten glass which consists in anchoring the base of the sheet in the bath, pulling the sheet through a metal die, which contacts with the sides thereof throughout the width of the sheet, to smooth such sides, and cooling the die so that the sides of the glass sheet will not adhere thereto.

12. The process of drawing a glass sheet from the slot of a clay body in a bath of molten glass which consists in anchoring the base of the sheet to said body, pulling the sheet through a smooth walled metal die, which contacts with the sides thereof throughout the width of the sheet to smooth such sides, and cooling the die so that the sides of the glass sheet will not adhere thereto.

13. The process of drawing a glass sheet which consists in anchoring the base of the sheet between the walls of a pair of slot members lying in a melted glass bath, one above the other, the lower member being of clay and the upper of metal, and drawing the sheet through the slot in the metal member as a die.

14. The process of drawing a glass sheet which consists in chilling a body of glass between the laterally extending walls of a pair of slot members, lying one above the other, in a melted bath of glass, anchoring the base of the glass sheet to said chilled body of glass, and drawing the sheet through the slot of the upper slot member, such upper slot member being of metal and acting as a die, and the lower slot member being of clay.

In testimony whereof, I have hereunto subscribed my name this 22nd day of December, 1919.

HALBERT K. HITCHCOCK.